United States Patent [19]

Jingu

[11] Patent Number: 5,537,127
[45] Date of Patent: Jul. 16, 1996

[54] IMAGE MONITOR SYSTEM CONSOLE

[75] Inventor: Masaharu Jingu, Otawara, Japan

[73] Assignee: Kabushiki Kaisha Toshiba, Kawasaki, Japan

[21] Appl. No.: 418,892

[22] Filed: Apr. 7, 1995

Related U.S. Application Data

[63] Continuation of Ser. No. 83,539, Jun. 30, 1993, abandoned.

[30] Foreign Application Priority Data

| Jun. 30, 1992 | [JP] | Japan | 4-173100 |
| Feb. 19, 1993 | [JP] | Japan | 5-030536 |

[51] Int. Cl.⁶ ........................... G09G 1/00
[52] U.S. Cl. .................... 345/1; 345/903; 248/921
[58] Field of Search ................ 345/1, 126, 2, 345/3, 903; 348/383, 36, 840, 839, 366; 361/681, 682; 248/917, 918, 919, 920, 921, 922, 923, 924; 312/7.2, 194

[56] References Cited

U.S. PATENT DOCUMENTS

| 3,909,525 | 9/1975 | Fagan | 345/1 |
| 4,725,106 | 2/1988 | Shields et al. | 312/7.2 |
| 4,920,458 | 4/1990 | Jones | 248/917 |
| 5,134,390 | 7/1992 | Kishimoto et al. | 345/126 |

FOREIGN PATENT DOCUMENTS

| 0043983 | 3/1985 | Japan | 358/254 |

Primary Examiner—Richard Hjerpe
Assistant Examiner—Doon Chow
Attorney, Agent, or Firm—Oblon, Spivak, McClelland, Maier & Neustadt

[57] ABSTRACT

An image monitor system console includes upper and lower stage monitor units accommodated within a console body and arranged in a vertical state, the monitor units being connected to each other to be relatively tiltable and each of the monitor units including a multiple monitors for displaying images and an inclination angle changing assembly being operatively connected to the monitor units for changing vertical inclination angles of the monitor units in a direction towards observers sitting and/or standing in front of the system console. The inclination angle changing assembly includes a tilting mechanism for changing inclination angles of the monitor units and an operating mechanism for operating the tilting mechanism. In one aspect, only the upper monitor unit is tiltable with respect to the observers to an angle within an arrowable range for observation. In another aspect, the monitor units are together moved vertically along rails while changing the inclination angles with respect to the observers.

10 Claims, 8 Drawing Sheets

IMAGE MONITOR SYSTEM CONSOLE

This application is a continuation of application Ser. No. 08/083,539, filed on Jun. 30, 1993, now abandoned.

BACKGROUND OF THE INVENTION

The present invention relates to an image monitor system console to be installed in an image monitor room as one work station in, for example, a medical image treating system particularly in which a plurality of monitor units are arranged in vertical stages for displaying medical images for visual monitoring or diagnosis of an operator.

Modernly, a picture archiving and communication system (PACS) has been developed in which medical images generated from various medical equipments are stored in the form of digital signals in an image database together with another basic information of, for example, a patient and then transmitted to general dispancy sections in the form of the digital signals. This distributes film-less operation. The term "medical image" used herein represents images or pictures of, for example, patients used for observation, diagnosis or other medical treatments.

Figure 11:
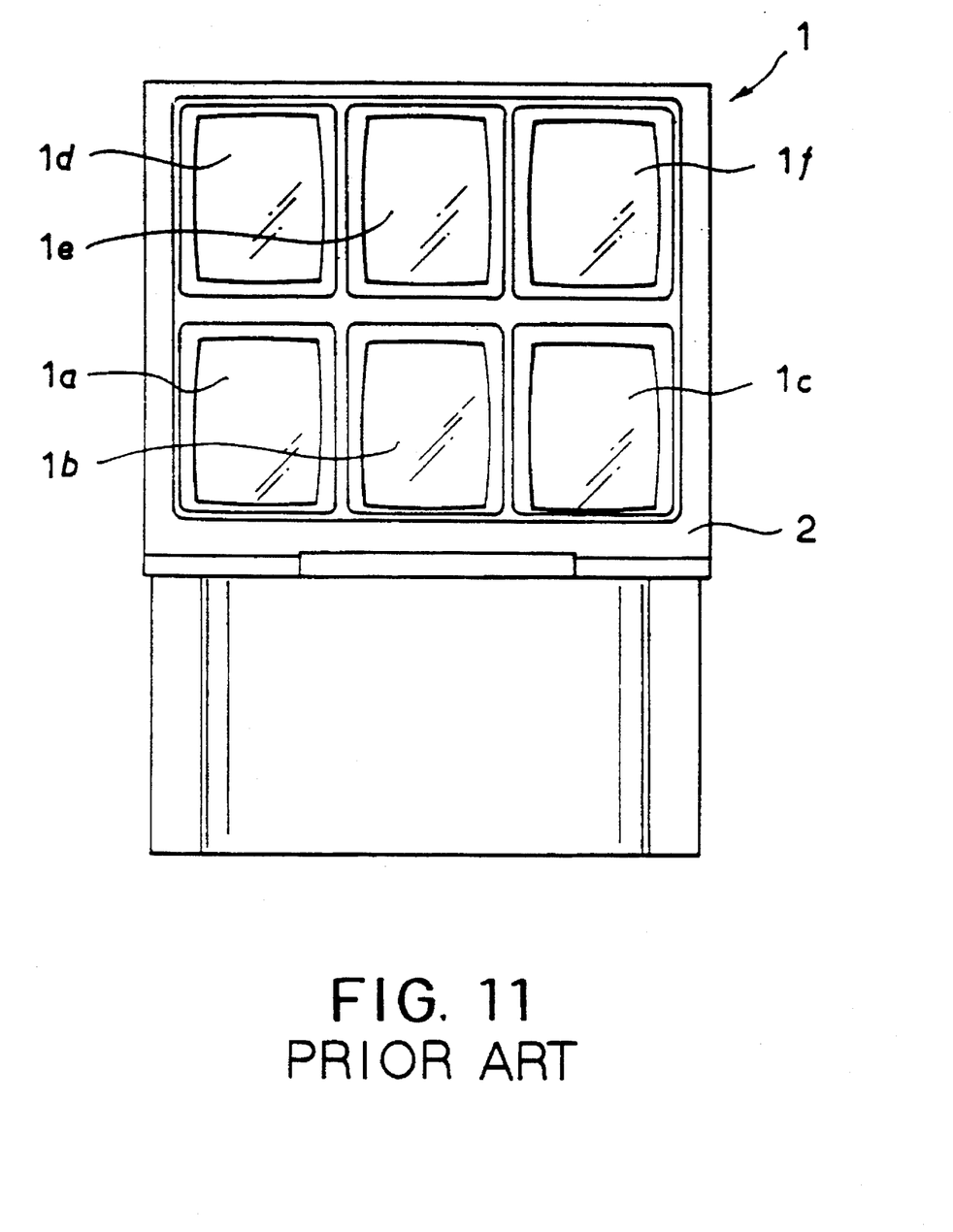
FIG. 11 is a front view of an image monitor system console of prior art.

FIG. 11 shows one example of a conventional system console 1 for this purpose which is installed in an image monitor room or section, for example, and this image monitor system console 1 is connected to the PACS through communication line. Medical images required are called from the database by operating a keyboard of the image monitor system console 1 and the called images are displayed on monitor units of the system console as picture images and the observation results can be inputted to the database as auxiliary information.

The conventional image monitor system console of FIG. 11 is provided with six monitor units (CRT display units) 1a to 1f which are arranged in vertically two stages each including three monitors, constituting a multi-image display structure accommodated in an outer frame 2. Namely, in the illustration, three monitors 1a, 1b and 1c are arranged in the lower stage monitor unit and three monitors 1d, 1e and 1f are arranged in the upper stage monitor unit, and these upper and lower stage monitor units are set with predetermined fixed inclined angles for the purpose of easily monitoring or observing by an operator who usually sits in front of the console system 1.

However, in the image monitor system console of the structure of FIG. 11, the inclinations of the image surfaces of the upper and lower stage monitor units with respect to an operator are fixed, and accordingly, an inconvenience has been caused in a case where different operators monitor or observe the images because different operators have different attitudes and positions and their eye positions are also different in height. This inconvenience may require the operators to observe the monitor surfaces with their uneasy positions or attitudes, resulting in increasing of fatigue and degraded image observing efficiency. Furthermore, when a plurality of persons observe together the same image on the monitor surface, their observing angles are different and, in an adverse case, observing eye points may be out of proper monitoring angle range, thus also providing a problem and being inconvenient for proper monitoring, observation diagnosis or judgement.

SUMMARY OF THE INVENTION

An object of the present invention is to substantially eliminate defects or drawbacks encountered in the prior art and to provide an image monitor system console including a plurality of vertical monitor unit stages capable of changing inclination angles of the monitor units within an allowable range for the monitoring of observers sitting and standing in front of the system console.

This and other objects can be achieved according to the present invention by providing an image monitor system console comprising:

a base;

a console body mounted on the base and provided with an outer frame; and a plurality of monitor units accommodated in the console body and arranged in a plurality of vertical stages, the monitor units being connected to each other to be relatively tiltable and each of the monitor units including a plurality of monitors for displaying images; and Preferably, the system console further comprises means operatively connected to the monitor units for changing vertical inclination angles of the monitor units in a direction towards an observer positioned in front of the system console.

In preferred embodiments, the inclination angle changing means operates so as to change at least an inclination angle of an uppermost monitor unit of the vertically arranged monitor units. The inclination angle changing means changes the inclination angle of the uppermost monitor unit so that the inclination angle is within an allowable range for observation of a plurality of observers who sit and/or stand in front of the system console.

The vertically arranged monitor units include upper and lower two stage monitor units and the inclination angle changing means changes the inclination angle of the upper stage monitor unit. Each of the monitor units includes a plurality of monitors arranged horizontally as viewed by observers.

The inclination angle changing means comprises a tilting mechanism for tilting the uppermost monitor unit and an operating mechanism for operating the tilting mechanism.

The tilting mechanism is disposed between the uppermost monitor unit and a lower monitor unit disposed below the uppermost monitor unit and comprises a means capable of being expanded and contracted in accordance with an operation of the operating mechanism to change the inclination angle of the uppermost monitor unit with respect to the lower monitor unit and a locking means secured to the lower monitor unit for locking the inclination of the uppermost monitor unit. The expandable and contractable means is a gas spring means expandable and contractable in a locking released state. The locking means is operated by the operating mechanism, the operating mechanism comprising a lock releasing means for releasing the locking means of the tilting mechanism and a lever member for operating the lock releasing means, the lock releasing means and the lever member being operatively connected through a wire means which transfers a lever operation force to the lock releasing means.

A height adjusting means is further provided for the base of the system console to adjust a vertical height of the console body.

In another aspect, the inclination angle changing means comprises a rail means which is secured to the outer frame of the console body and along which the monitor units are movable, the rail means being composed of a pair of rails secured at respective both ends to the outer frame so as to provide a vertically arcuate configuration, and an operating means for vertically moving the monitor units along the rails and the monitor units are vertically moved along the rails while changing relative inclination angle between the monitor units when the operating means is operated.

The rails are positioned on both side end portions of horizontally outermost monitors in the respective monitor units and the inclination angle changing means further comprises roller means mounted to the sides of the horizontally outer most monitor units to be rollable along the rails when the operating means is operated.

The operating means includes a hydraulic cylinder assembly secured at one end to the console body and at another end to one of the monitor units and a drive means for operating the cylinder assembly to expand or contract a stroke of the cylinder assembly.

According to the present invention of the structures described above, in the first aspect thereof, when an observer operates the inclination angle changing means, the uppermost monitor unit is capable of being tiltable and the monitor unit is stopped with the desired inclination angle when the operator stops the operation of the inclination angle changing means. This inclination angle is easily and surely adjusted by the observer even if a plurality of observers sit and/or stand in front of the system console to the inclination angle within allowable range for observation. The inclination angle changing means includes the tilting mechanism and the tilting mechanism operating mechanism which is located to a position easily manually accessible for the observer. Accordingly, the monitoring efficiency can be improved and the labor of the observers can be reduced.

In another aspect, the upper and lower stage monitor units interconnected to each other are movable along the rails while changing the inclination angles with respect to the observers. The movement of the monitor units along the rails can be adjusted by the cylinder assembly which is driven by the drive means so as to expand or contract the stroke of the cylinder assembly.

Accordingly, in both the aspects, the monitor units of the image monitor system console vertically arranged can be changed in their relative inclination angles with respect to observers sitting and standing in front of the system console so as to take preferable positions in the allowable angle range for the observation, thus improving the monitoring efficiency.

BRIEF DESCRIPTION OF THE DRAWINGS

For a better understanding of the present invention and to show how the same is carried out, reference will be made, by way of preferred embodiments, to the accompanying drawings, in which.

DESCRIPTION OF THE PREFERRED EMBODIMENTS

First, before the detailed description of the present invention by way of preferred embodiments, the basic conception by which the present invention was conceived will be described hereunder with reference to FIG. 1, which schematically shows an attitude or position of an operator who sits in front of a system console to which a monitor unit is accommodated. In experiments of inventors and many other persons having different attitudes and positions for obtaining proper allowable range of eye angles of the operator, it was found that the most preferable angles of the observation or monitoring of one operator who sits in front of the monitor unit are about 90° between the surface of the upper monitor ($1d$, $1e$ and $1f$ of FIG. 11) and the upper eye line EU from the sitting operator at substantially the central portion of the upper monitor $1e$ and about 89.3° between the surface of the lower monitor ($1a$, $1b$ and $1c$ of FIG. 11) and the lower eye line EL from the sitting operator at substantially the central portion of the lower monitor $1b$. However, it is not absolutely said that these angles are suitable for the observation or monitoring of the monitor surfaces for other observers or persons who sit and/or stand in the vicinity of the operator who centrally sits in front of the monitor units. Accordingly, it was found that it is desired to construct the system console so as to change the inclination angles of the monitor units to easily and surely monitor or observe the monitor surfaces for as many persons as possible.

The present invention was conceived in view of these points made through experiments and for the purpose of making possible easy and sure observation or monitoring of the monitor surfaces for many observers as well as only one operator.

Figure 2:
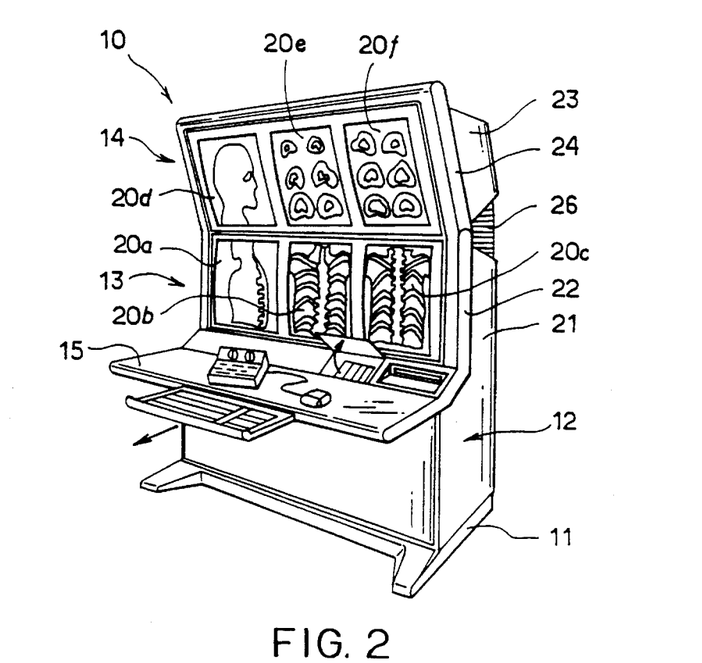
FIG. 2 is a perspective view showing an outer appearance of one embodiment of an image monitor system console according to the present invention.

A first embodiment of the present invention will be described hereunder with reference to FIG. 2 showing a perspective view of an outer appearance of an entire image monitor system console for medical use.

Figure 1:
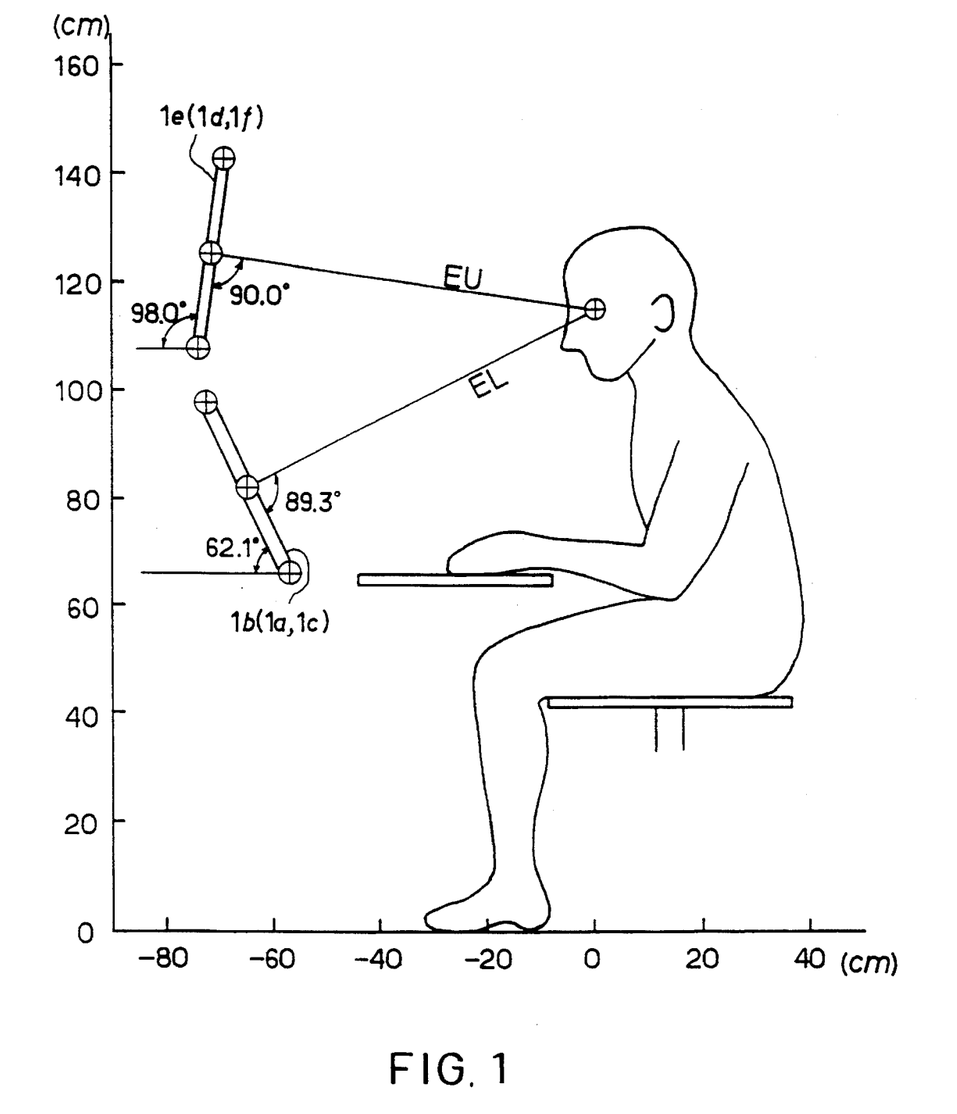
FIG. 1 is a view briefly showing a monitoring attitude of an observer and a positional relationship between the observer and monitor units of an image monitor system console for the understanding of the present invention.

Referring to FIG. 1, an image monitor system console 10 is a six monitor type multi-stage image observation system console, and the system console 10 is composed of a base 11, a body 12 mounted on the base, provided with an outer frame and adapted to accommodate therein various devices or elements such as communication equipment or devices, a power source, and the like, a monitor device disposed above the body 12 and including lower and upper monitor units 13 and 14, each including three monitors in the illustrated embodiment, and an operation table or board 15 projecting forward from the body 12.

Figure 3:
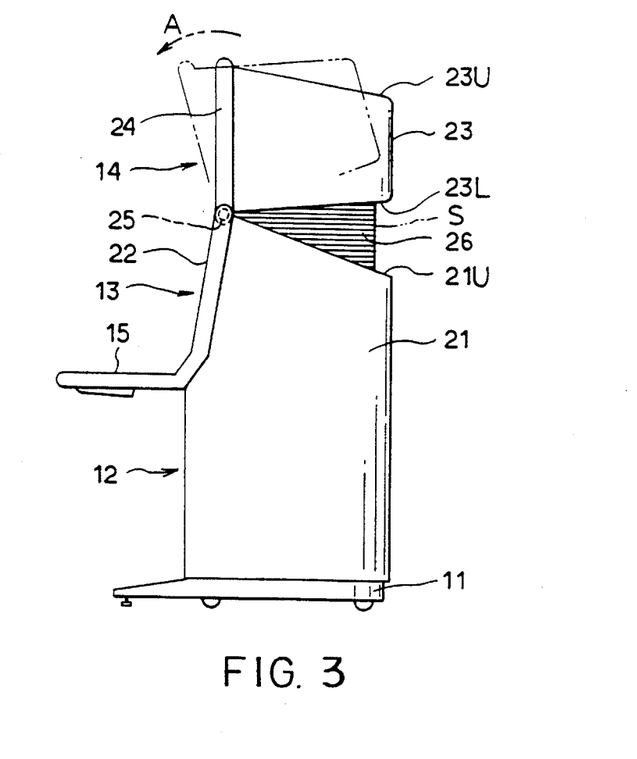
FIG. 3 is a side view of the system console of FIG. 2.

The lower stage monitor unit 13 is composed of, for example, three monitors 20a, 20b and 20c, such as cathode ray tubes CRT, arranged horizontally, a lower stage cover 21 for accommodating these monitors in a fixed state and a lower stage frame 22 provided at the front edge portion of the lower stage cover 21. As shown in FIG. 3 as a side view, the upper edge side of the lower stage cover 21 is slightly inclined backward, and accordingly, the monitor surface of the lower stage accommodated in the lower stage cover 21 has an upward inclination so as to easily and surely observe the monitor surface for an operator who generally sits in front of the monitor surface. The inclination angle of the monitor surface of each monitor 20*a*, 20*b* or 20*c* determined so that the images on the monitor surfaces are within an allowable range of observation eye line of the operator. This allowable range is usually is a range from which the monitor image can be easily and surely observed without failure or error by the operator in front of the monitor surface. The upper surface 21U of the lower stage cover 21 has a downward inclination towards the rear surface thereof as shown in FIG. 3.

The lower stage cover 21 may be commonly utilized for a cover of the body 12 and the lower stage frame 22 is integrally formed so as to provide a frame of the operation table 15 to support an upper plate of the table 15.

The upper stage monitor unit 14 is composed of three monitors 20*d*, 20*e* and 20*f*, such as CRT, arranged horizontally, an upper stage cover 23 for accommodating these monitors in a fixed state and an upper stage frame 24 provided at the front edge portion of the upper stage cover 23. The upper stage cover 23 has substantially a box shape outer appearance having a front opening, but its lower and upper surfaces 23L and 23U have inclinations towards the rear surface thereof so as to narrow the vertical width as shown in FIG. 3. The lower edge portion of the front side of the upper stage frame 24 is connected tiltably through, for example, hinge means 25 to the upper edge portion of the front side of the lower stage frame 22. Accordingly, the upper stage monitor unit 14 can be tilted frontward as shown with an arrow A in FIG. 3 about the hinge means 25. According to the inclined shapes of the lower surface 23L of the upper stage cover 23 and the upper surface 21U of the lower stage cover 21, a space S triangular in section is formed between the upper and lower covers 23 and 21, and the side portions of this space S are enclosed with tilt covers 26, 26 in the form of bellows to be vertically foldable.

An operation mechanism and a tilting mechanism for tilting the upper stage monitor unit 14 and adjusting the tilting angle thereof will be described hereunder.

Figure 4:
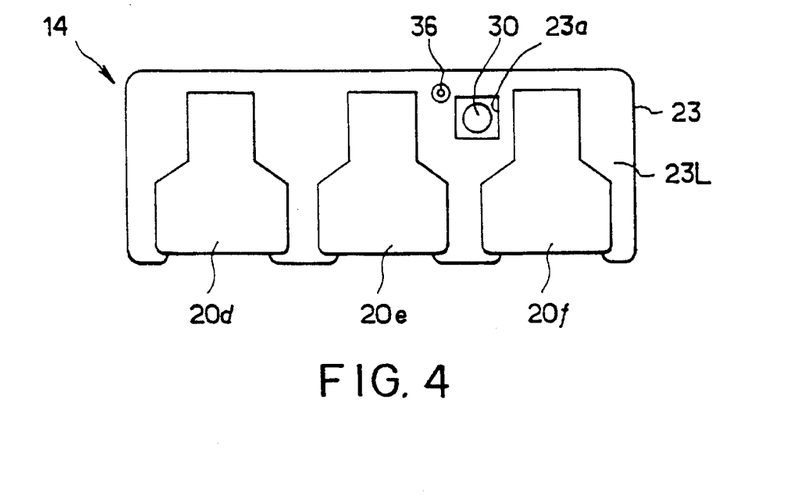
FIG. 4 is an illustrated plan view showing a location of the monitor unit and a gas spring means.

The arrangement of the monitors 20*d*, 20*e* and 20*f* of the upper stage monitor unit 14 is briefly shown in FIG. 4, in which a gas spring means 30 constituting a main component of the tilting mechanism is disposed in a space between the adjacent electon gans of the monitors 20*e* and 20*f*, for example. The gas spring means 30 is of course arranged in a space between the monitor units 20*d* and 20*e*.

The detailed arrangement of the above and associated structures is described with reference to FIGS. 5 and 6.

Figure 5:
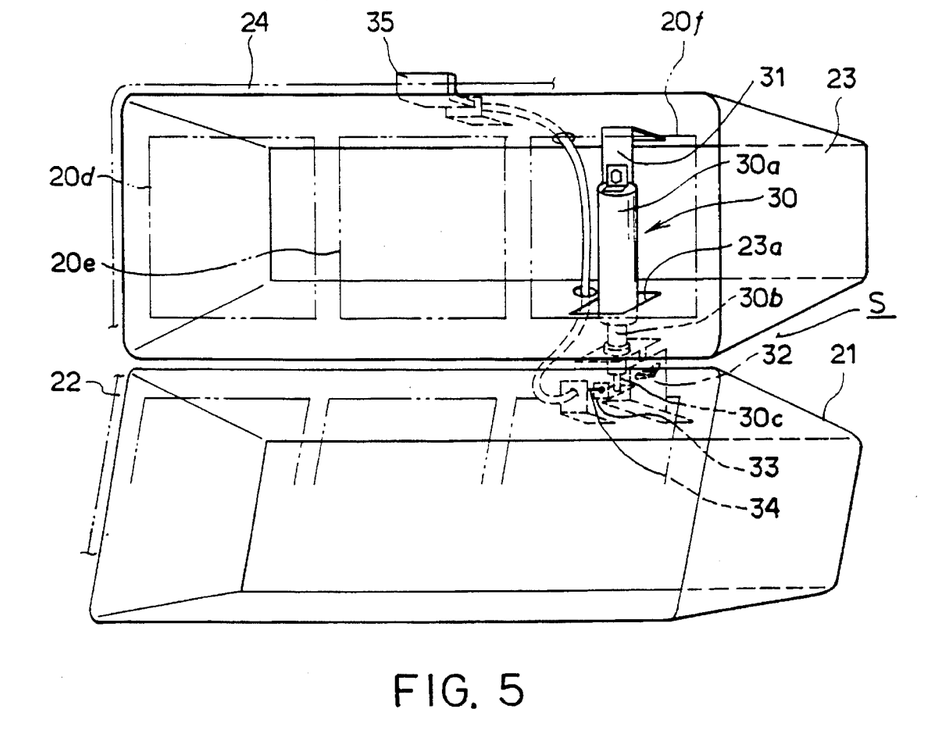
FIG. 5 is a perspective view in an enlarged scale showing an arrangement of an inclination changing means including a tilting mechanism and an operating mechanism for the monitor units of FIG. 2.
Figure 6:
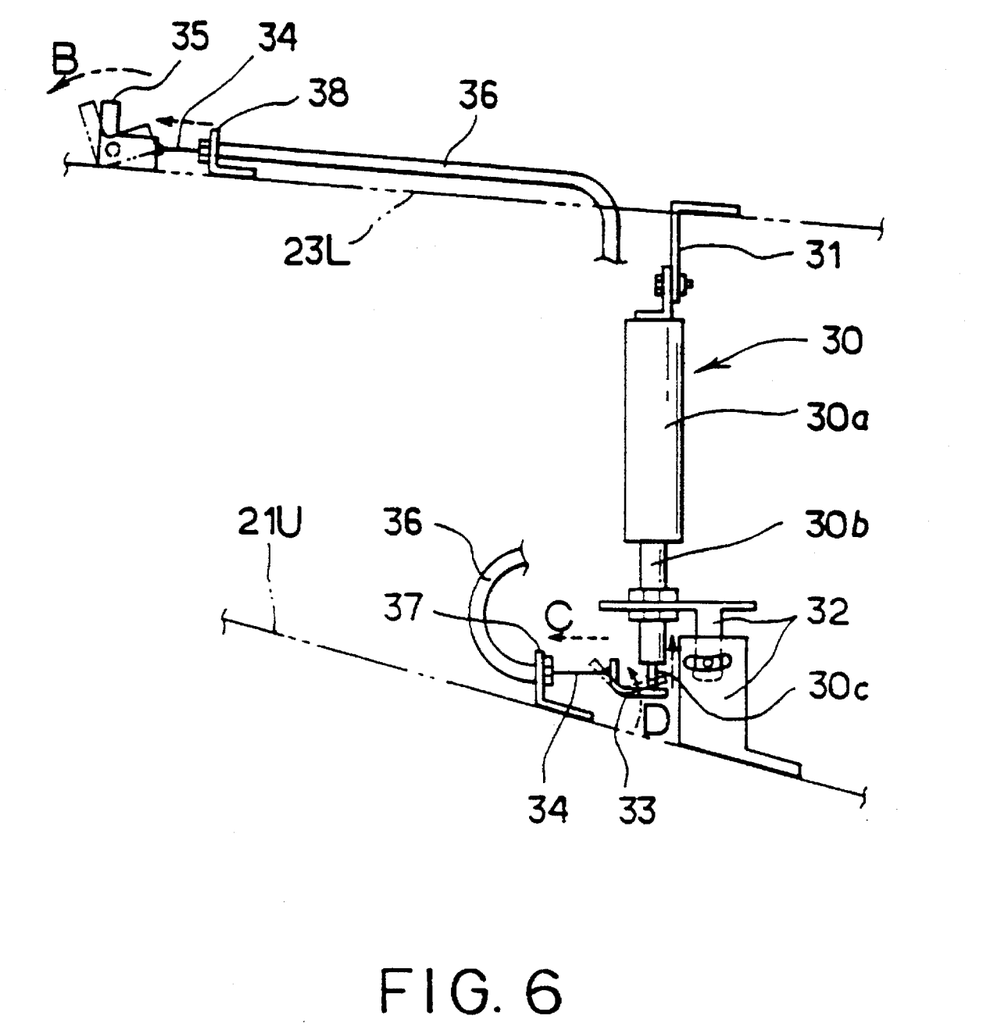
FIG. 6 is a view showing a locked or locking releasing state of the inclination angle changing means.

Referring to FIGS. 5 and 6, the gas spring means 30 has a cylinder assembly 30*a* having an upper portion attached to a suspension fitting 31 which is secured to the upper surface 23U of the upper stage cover 23. A lower portion of the gas spring means 30 penetrates a hole 23*a* formed to the lower surface 23L of the upper stage cover 23 in a suspended manner in the space S between the upper and lower stage covers 23 and 21. The gas spring means 30 also includes a piston rod 30*b*, for the cylinder assembly 30*a*, which is secured to the outside of the upper surface 21U of the lower stage cover 21 by means of an engaging fitting 32 in a manner that, even in a case where the piston rod 30*b* is swung in front and rear directions of the system console, the engaging fitting 32 interconnects the piston rod 30*b* and the lower stage cover 21 with the swing amount absorbed, if the swing angle of the piston rod 30*b* is within a predetermined range, for example, a range between 0° to 15° of the forward inclination of the upper stage monitor unit 14.

At the lower end of the gas spring means 30, a releasing pin 30*c* projects from the piston rod 30*b*, and the releasing pin 30*c* abuts, in its locked state, against an L-shaped rotation releasing key 33. The central portion of the rotation releasing key 33 is supported by the lower stage cover 21 through an appropriate member, not shown.

To the rotation releasing key 33 is connected one end of a wire 34 which is guided into the upper stage cover 23 from the space S between the upper and lower stage covers 23 and 21 at the rear side portion of the upper stage cover 23, then extends upwards in the space at the rear side of the upper stage cover 23 and around the outside of the upper surface 23U of the upper stage cover 23. The wire 34 further goes around to the front surface side of the upper cover 23 and the front end of the wire 34 is then connected to a lever 35 secured to the upper edge portion of the front side of the upper stage cover. The lever 35 is manually operated and has a rotation center which is pivoted to the upper stage cover 23. The wire 34 is sheathed in a wire tube 36 having both ends supported by support fittings 37 and 38 to the lower and upper stage covers 21 and 23 as shown in FIG. 6.

In the above structure or arrangement, the lever 35, the wire 34 and the rotation releasing key 33 constitute the operation mechanism in the present invention and the gas spring means 30, the suspension fitting 31 and the engaging fitting 32 constitute the tilting mechanism in the present invention.

The image monitor system console 10 of the structures described above is installed in an image monitor room as one workstation of the PACS and calls necessary image data regarding a patient from the image memory device through the communication line by the operation of the keyboard.

In an actual monitoring operation, when the lever 35 is not operated as shown by a solid line in FIG. 6, the wire 34 is not also operated and the rotation releasing key 33 maintains its position abutting against the releasing pin 30*c* of the gas spring means 30. Accordingly, the gas spring means 30 maintains its locked condition and the forward inclination of the upper stage monitor unit 14 with respect to the lower stage monitor unit 13 is hence not changed.

On the contrary, when the lever 35 is rotated forward in a direction shown by an arrow B, the wire 34 is pulled forward in a direction shown by an arrow C. The pulling force of the wire 34 transferred to the other side end to thereby rotate the rotation releasing key 33 in a counter-clockwise direction shown by an arrow D in FIG. 6. Thus, the releasing pin 30*c* moves upwards and the locked state of the gas spring means 30 is hence released. It is of course noted that, for this purpose, the rotation releasing key 33 has a shape to force upwards the releasing pin 30*c* when rotated for example as shown in FIG. 6 as a side view. When the locked condition of the gas spring means 30 is released, the upper stage monitor unit 14 can be rotated forward to the side of the operator with maintaining the lever 35 rotated. Then, when the operator releases the lever 35 at a desired inclination of the upper stage monitor unit 14, the lever 35 is rotated in a direction reverse to the arrowed direction B and hence the releasing pin 30*c* returns to its original position, thereby again locking the gas spring means 30. Therefore, as described above, according to the operating and tilting mechanism of the present invention, the upper stage monitor unit 14 can be tilted in a predetermined angle range, for example, between 0° to 15° from a standard fixed position, and fixed to the tilted position, for example, to a position shown in FIG. 3.

According to the operating and tilting mechanism of the image monitor system console of the present invention, the upper stage monitor unit including the CRT display units having relatively heavy weight can be easily tilted and adjusted to a desired angle position.

Then, in a case where one operator monitors the monitor surfaces of the monitors of the upper stage monitor unit 14, he can easily change the forward inclination of the upper stage monitor unit 14 with easy handling operation, thus always realizing a monitoring position suitable for the individual operator. Furthermore, when a plurality of observers, some of them sitting and other of them standing in front of the system console, monitor the monitor surfaces, the upper stage monitor unit 14 can be tilted and adjusted to the most desired angle position suitable for observation of all observers in accordance with the attitudes or eye lines of the observers. Thus, the adjustment of the tilting angle of the upper stage monitor unit makes easy the monitoring thereof, which can avoid the observation of the observers in undesired attitudes or positions of the observers and reduce their fatigue for the monitoring. The monitoring and observing efficiency can be hence remarkably increased.

In the described embodiment, the tilting mechanism includes the gas spring means 30, but this may be substituted with other means acting substantially in the same manner and a plurality of gas spring means or other means may be utilized. Furthermore, a manually operated handle means and an associated force transferring mechanism may be substituted for the lever 35 and the wire 34 of the present invention as far as they operate substantially in the manner similar to that of the lever and the wire of the present invention.

Figure 7:
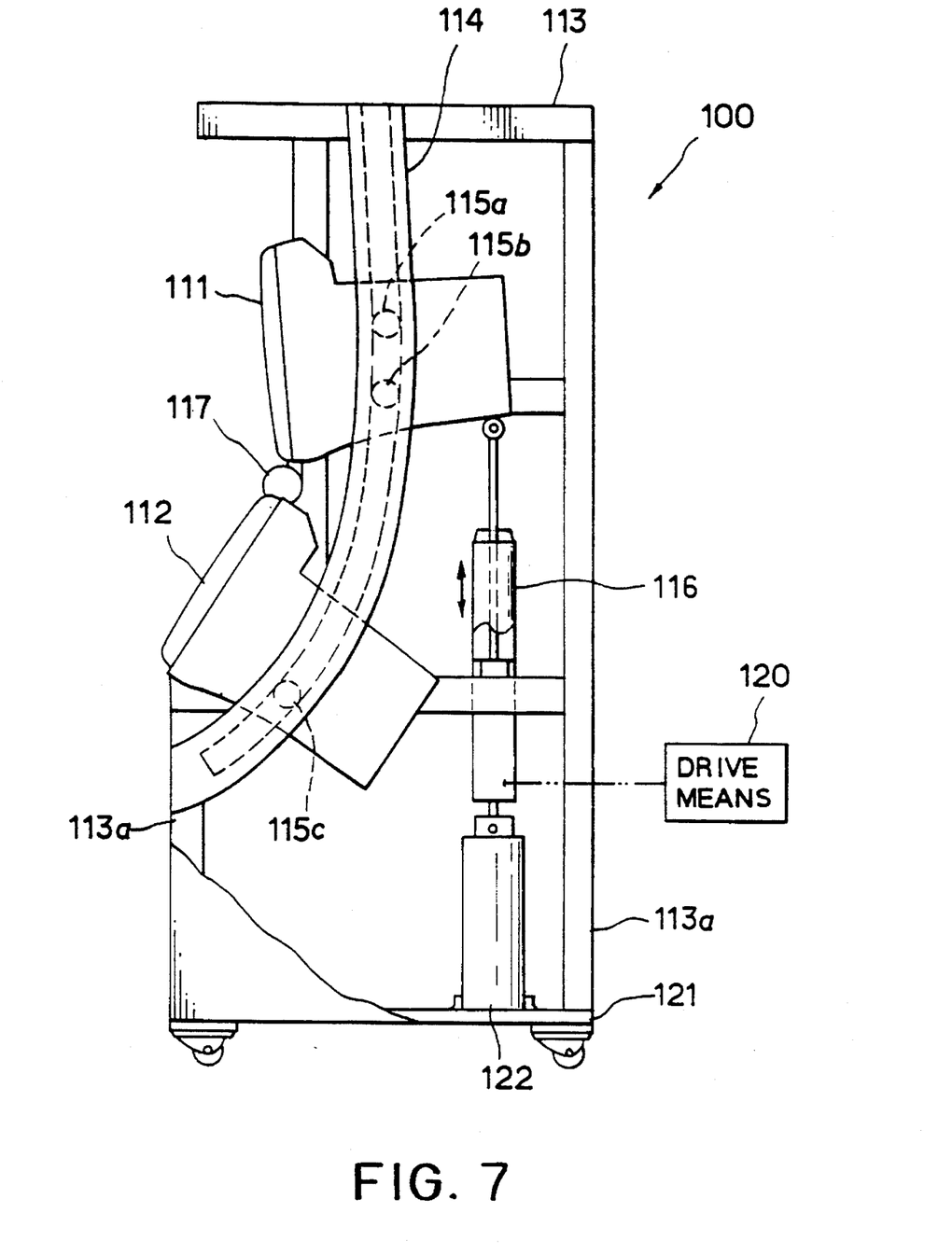
FIG. 7 is an illustrated side view of another embodiment of the image monitor system console with an outer cover removed.
Figure 8:
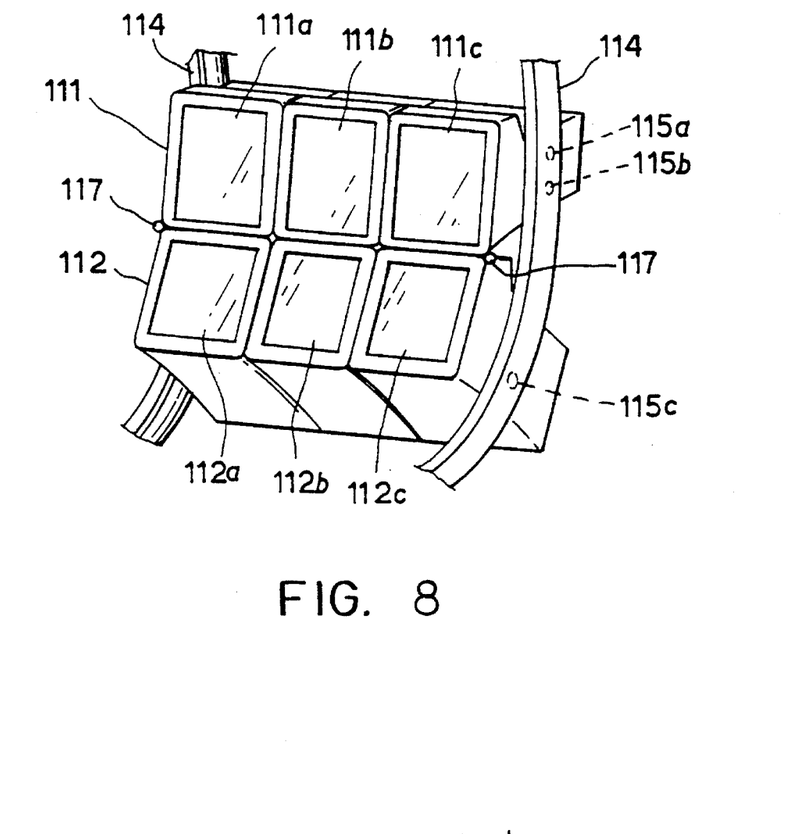
FIG. 8 is a perspective view briefly showing an inclination angle changing means of the system console of FIG. 7.
Figure 9:
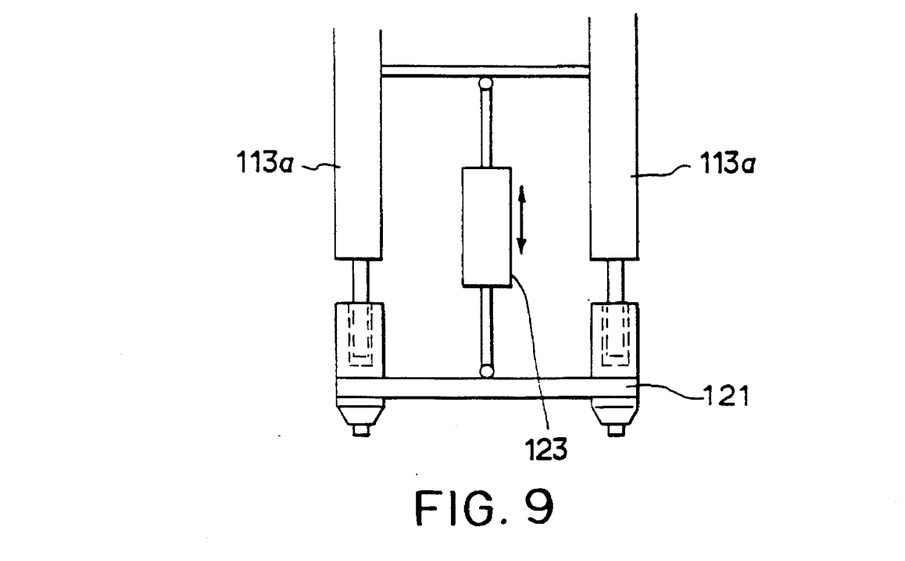
FIG. 9 is a view briefly showing a height adjusting means for changing the height of the body of the system console.

FIGS. 7 and 8 represent another embodiment of the present invention, in which the upper and lower monitor units are both moved so that their inclination can be changed.

Namely, referring to FIG. 7, an image monitor system console 100 has a basic structure substantially identical to that of the first embodiment. That is, the system console 100 is a six monitor type multi-stage image monitor system console, and the system console 100 is composed of a base, a body mounted on the base and adapted to accommodate therein various devices or elements such as communication equipment or devices, a power source, and the like, and a cover. These members are not specifically numbered in FIGS. 7 and 8. The cover is removed from the side view of FIG. 7 for easy observation of the inside the system console 100. The system console 100 is also provided with lower and upper monitor units and, each including three monitors in the illustrated embodiment, and an operation table or board 15 of FIG. 1 is not provided for this embodiment.

In this embodiment as briefly shown in FIG. 8, the lower stage monitor unit 112 is composed of, for example, three monitors 112a, 112b and 112c, such as cathode ray tubes CRT, arranged horizontally, and the upper monitor unit 111 is also composed of three monitors 111a, 111b and 111c arranged horizontally. These upper and lower stage monitor units 111 and 112 are connected to be relatively rotatable by means of connection fittings 117 at least at both horizontal ends of the upper and lower stage monitor units 111 and 112. Rail means including two rails 114 are secured to a frame 113 constituting an outer body of the system console 100, and these rails 114 are disposed vertically parallel and secured to the frame 113 at their both respective ends so as to each provide an arcuate shape. The rails 114 are positioned on both sides of the horizontally outermost monitors.

However, it is preferred that the rails 114 extend arcuately at their lower portions and substantially linearly vertically or slightly arcuately at portions in front of an operator who sits or stands in front of the monitor units. This substantially linearly vertical or slightly arcuate structure of the rails 114 is made possible to smooth movement of the monitor units 111 and 112 along the rails 114 and easy monitoring of the operator.

The upper and lower monitor units 111 and 112 are mounted to the rails 114 to roll therealong through rollers 115a, 115b and 115c. Namely, two rollers 115a and 115b are attached to the side surfaces of the outer side monitors 111a and 111c of the upper stage monitor unit 111, respectively, and one roller 115c is attached to each of the side surfaces of the outer side monitors 112a and 112c. The reason why only one roller 115c is attached to the lower side monitor 112a (112c) is for smooth rolling movement of the monitor 112a along the rails 114 at arcuate portions of the rails 114.

According to this structure, the upper and lower stage monitor units 111 and 112 are moved together along the rails substantially vertically as viewed from an operator side who sits or stands in front of the system console 100.

A hydraulic cylinder assembly 116 is connected at one, i.e. upper as viewed, end to the upper stage monitor unit 111 so as to carry out the stroke motion thereof. The hydraulic cylinder assembly 120 is secured at the other end, i.e. lower end, to the base 121 through a support member 122, for example. The connection between the lower end of the cylinder assembly 116 is made through pin connection, for example, to be pivotable so that the hydraulic cylinder assembly 116 is pivoted in accordance with the movement of the upper and lower stage monitor units 111 and 112. The hydraulic cylinder assembly 116 is also connected to a drive means 120 to drive the hydraulic cylinder assembly 116. Namely, when the drive means 120 is operated so that the stroke of the hydraulic cylinder assembly 116 is expanded, the upper stage monitor unit 111 is moved upward together with the lower stage monitor unit 112 and operated so that the stroke thereof is contracted, the upper and lower stage monitor units 111 and 112 are lowered. This driving means may be disposed inside the system console 100.

Furthermore, it is preferred that the drive means 120 is operated under a remote control operation to expand or contract the stroke of the hydraulic cylinder assembly 116 to move or slide the upper and lower stage monitor units 111 and 112 to positions having desired angles with respect to the eye line of an operator.

As described above, according to this embodiment, the upper and lower stage monitor units 111 and 112 are movable along the rails 114 to the positions suitable for the easy and sure observation or monitoring of an operator or observers who sit and/or stand in front of the monitor units with the allowable angle range for the observation.

Further, according to the present invention, the following structures or modifications may be commonly made with respect to the above embodiments.

First, with reference to FIG. 7, lower portions 113a of the frame 113 can be constructed to be vertically movable by, for example, hydraulic cylinder means 123 as briefly shown in FIG. 8 so as to adjust entirely the height of the system console 100, that is, to adjust the vertical positions of the monitor units 112 and 113. The hydraulic cylinder means 123 may be substituted with a link mechanism. These hydraulic cylinder means 123 and link mechanism are of known structures themselves.

Figure 10:
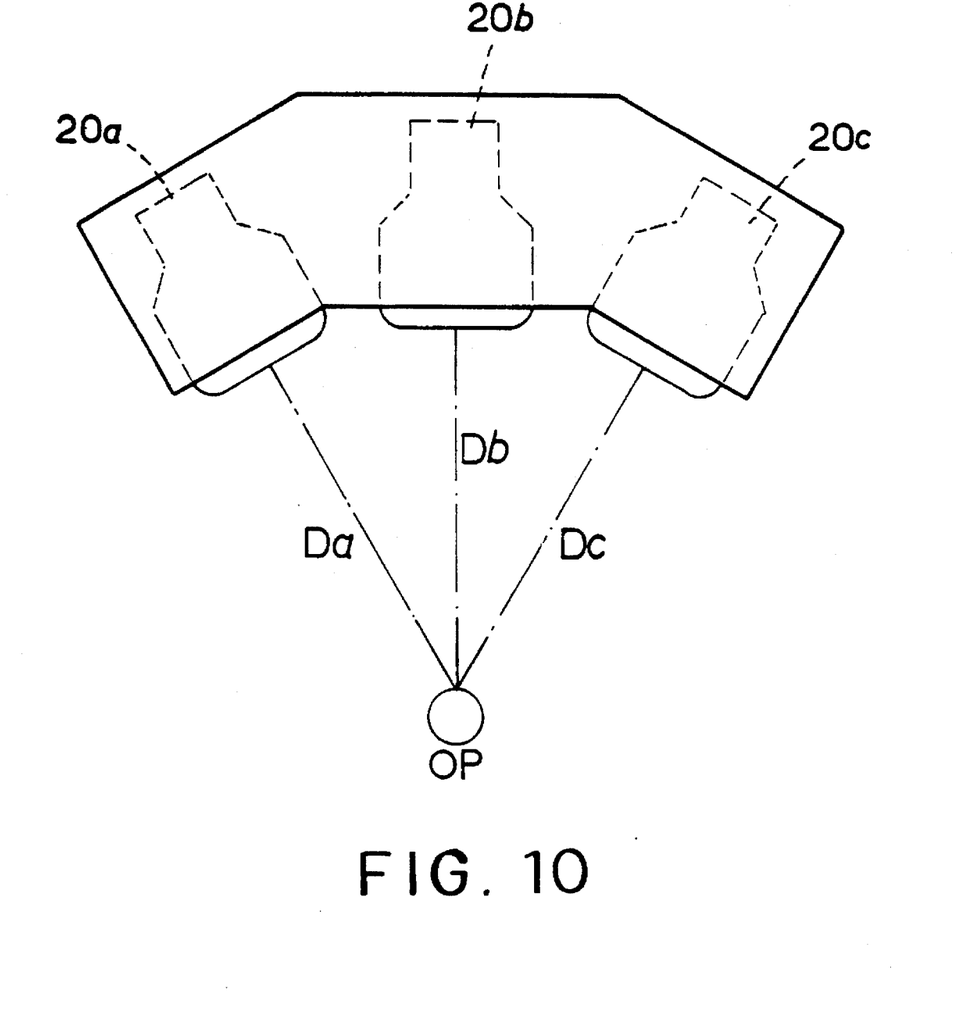
FIG. 10 is an illustrated plan view of a modified arrangement of the monitor unit.

Next, as briefly shown in FIG. 10 as a plan view, it may be preferred that the frame of the system console is constructed so that the side monitors 20a and 20c, for example, are positioned with certain horizontally inclined angles to further facilitate the easy and sure observation of the monitor surfaces. These angles may be desired so that the distances between the monitor surfaces and the eye of an operator are substantially equal to each other. Namely, it may be desired that these angles are decided so that the distance Da and Dc are equal to the distance Db between the central monitor surface of the monitor 20a and the eye of the operator OP in FIG. 10.

Furthermore, in the above embodiments, the upper and lower two stage monitor units each including three monitors are described, but more than two stages and more than three monitors in each stage may be arranged without departing the scope of the present invention.

What is claimed is:

1. An image monitor system console comprising:

a base;

a console body mounted on said base and provided with an outer frame;

a plurality of monitor units accommodated within said console body and arranged in a plurality of vertical stages, said monitor units being connected to one another to be relatively tiltable and each of said monitor units including a plurality of monitors for displaying images;

height adjusting means provided for said base of said system console to integrally adjust a vertical height of said monitor units in a direction toward an observer positioned in front of said system console; and inclination angle changing means operatively connected to the monitor units for changing a vertical inclination angle of the monitor units, said inclination angle changing means comprising a tilting mechanism for tilting an uppermost monitor unit and an operating mechanism for operating the tilting mechanism, said tilting mechanism being disposed between the uppermost monitor unit and a lower monitor unit disposed below the uppermost monitor unit and comprising a gas spring means extendable and contractible in accordance with an operation of said operating mechanism to change the inclination angle of the uppermost monitor unit with respect to the lower monitor unit and a locking means for locking the inclination of the uppermost monitor unit, wherein said plurality of monitor units are adjusted by said tilting mechanism to change a vertical inclination angle of the monitor units in a direction toward an observer positioned in front of the system console for monitoring the display means so as to change at least an inclination angle of the uppermost monitor unit having a display surface and being tiltably supported by the console body at a portion near the display surface.

2. An image monitor system console according to claim 1, wherein said tilting mechanism is disposed between said uppermost monitor unit and a lower monitor unit disposed below said uppermost monitor unit and comprises means capable of expanding and contracting in accordance with an operation of said operating mechanism to change said inclination angle of said uppermost monitor unit with respect to said lower monitor unit, and locking means secured to said lower monitor unit for locking an inclination of said uppermost monitor unit.

3. An image monitor system console according to claim 2, wherein said means for expanding and contracting comprises gas spring means which is expandable and contractible in a lock released state.

4. An image monitor system console according to claim 2, wherein said locking means is operated by said operating mechanism, said operating mechanism comprising a lock releasing means for releasing said locking means of said tilting mechanism and a lever member for operating said lock releasing means, said lock releasing means and said lever member being operatively connected together via a wire means which transfers a lever operation force to said lock releasing means.

5. An image monitor system console according to claim 4, wherein said lever member is secured to a monitor unit at a portion easily accessible by said observer.

6. An image monitor system console comprising:

a base;

a console body mounted on said base and provided with an outer frame;

a plurality of monitor units accommodated within said console body and arranged in a plurality of vertical stages, said monitor units being connected to one another so as to change an inclination angle of at least a lowermost monitor unit, each of said monitor units including a plurality of monitors for displaying images;

height adjusting means provided for said base of said system console to integrally adjust a vertical height of said monitor units in a direction it toward an observer positioned in front of said system console; and inclination angle limiting means for limiting inclination angles of said monitor units, said inclination angle limiting means comprising means for supporting at least the lowermost monitor unit so as to direct it upward with respect to a horizontal plane at a time when the monitor units are adjusted to a down position by said height adjusting means and comprising means for supporting both upper and lower monitor units so as to direct them substantially in a forward direction with respect to the horizontal plane at a time when the monitor units are adjusted to an up position by said height adjusting means.

7. An image monitor system console according to claim 6, wherein each of said monitor units includes a plurality of monitors arranged horizontally as viewed by observers.

8. An image monitor system console according to claim 7, wherein said horizontally arranged monitors include monitor surfaces substantially lying in a plane.

9. An image monitor system console according to claim 6, wherein said inclination angle limiting means comprises:

rail means which is secured to said outer frame of said console body and along which said monitor units are movable, said rail means being composed of a pair of rails secured at respective ends thereof to said to outer frame so as to provide a vertically arcuate configuration; and operating means for vertically moving said monitor units along said rails, wherein said monitor units are vertically moved along said rails while changing relative inclination angles between said monitor units when said operating means is operated.

10. An image monitor system console according to claim 9 wherein said height adjusting means includes a hydraulic cylinder assembly secured at one end thereof to said console body and at another end thereof to one of said monitor units, and a drive means for operating said hydraulic cylinder assembly to expand or contract a stroke thereof.

* * * * *